UNITED STATES PATENT OFFICE.

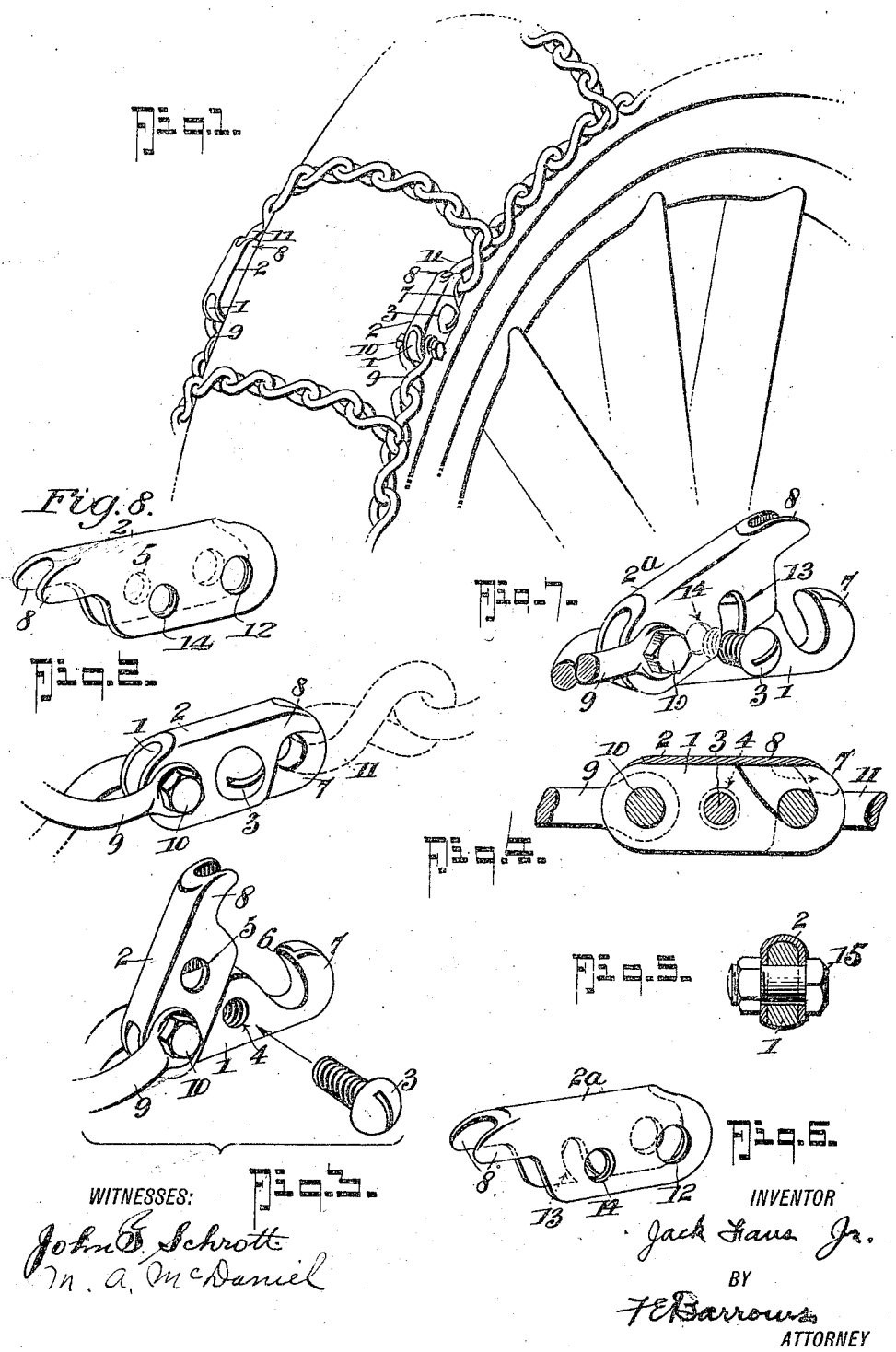

JACOB FAUS, JR., OF BOULDER, COLORADO.

FASTENER FOR AUTOMOBILE-CHAINS, &c.

1,127,423.  Specification of Letters Patent.  Patented Feb. 9, 1915.

Application filed May 9, 1914. Serial No. 837,529.

*To all whom it may concern:*

Be it known that I, JACOB FAUS, Jr., a citizen of the United States, residing at Boulder, in the county of Boulder and State of Colorado, have invented certain new and useful Improvements in Fasteners for Automobile-Chains, &c., of which the following is a specification.

The objects of the present invention are to provide a simple and inexpensive fastener for automobile chains and devices of similar construction which will permit of readily fastening and unfastening the ends of the chain, which will be strong and compact in construction, and which will be in form and appearance similar to a compact and integral chain link.

I will now proceed to describe my invention more in detail in connection with the embodiments thereof illustrated on the accompanying drawings, it being intended and understood that the invention is illustrated by, but is not limited to, the embodiments thereof so illustrated and described.

In the accompanying drawings: Figure 1 shows in perspective part of an automobile wheel with detachable chains thereon united by the fastener of the present invention. Fig. 2 shows in perspective the fastener of the present invention as used in uniting the ends of a chain or chains. Fig. 3 shows the fastener of Fig. 2 as it appears when open. Fig. 4 is a longitudinal section through the fastener with the inner hook member in elevation. Fig. 5 shows a central section of the fastener with a modified clamp. Fig. 6 shows in perspective a modified form of the outer casing. Fig. 7 shows in perspective a complete fastener embodying the modification, the fastener being shown in open position; and Fig. 8 shows in perspective the back of the casing of Figs. 2 and 3.

As illustrated in Figs. 1 to 4 the fastener is shown as made up of a central hook member 1 and an outer casing 2 inclosing said hook member, said hook member and casing being adapted to be clamped together in closed position by a screw 3 extending through the central opening 4 of the hook member and the openings 5 and 14 of the casing, the openings 4 and 14 being threaded to receive the screw 3. The hook member is provided with a hook recess 6 formed by the main body portion of the hook member and the end portion 7. The casing 2 is provided with a corresponding cut-away portion and with projections 8 which coöperate with the end portion 7 of the hook to inclose the outer portion of said hook recess and leave the inner portion thereof free to receive a chain link 11. The fastener can be suitably attached, either detachably or permanently, to a chain at one end. Such a chain of conventional form is indicated at 9 and a suitable bolt or rivet 10 passes through the end of the link and one end of the fastener. The bolt or rivet 10 may be made detachable or permanently fastened to the chain and fastener, or made integral with the chain, as by welding. It will also be understood that other kinds of chains can be suitably secured to one end of this fastener in a similar manner or in any other suitable manner, as will be readily understood. Where it is desired to use the fasteners of the present invention on automobile chains it is advantageous that one end should be permanently riveted or otherwise suitably secured to one end of the chain, since not only is loss of the fastener thereby avoided, but the chain link, or the bolt or rivet or other fastener of the chain or chain link, furnishes a pivot for the hook member and outer inclosing casing of the fastener, such a pivot for one end of the fastener together with the hook at the other end having the advantage over hooks at both ends that one end only may be opened while the other end is kept permanently and pivotally fastened together. Moreover by the use of such a pivot the parts can readily be brought into open or closed position and alinement of the various openings readily secured.

In Figs. 6 and 7 is shown a modified and preferred embodiment of the invention by means of which the fastener can be opened and closed without removal of the fastening screw. The outer casing 2ª is shown as provided with the projections 8 and with the openings 12 the same as in Figs. 2 and 3, but instead of making holes 5 and 14 through both sides of the casing one hole only is made in one side and a slot 13 is made in the other in which the screw 3 may work. The hook member 1 is similar in construction to that of Figs. 2 and 3, and a similar screw threaded opening 4 is provided. The hole 14 in the casing is also screw threaded so that when the screw is tightened it clamps both sides of the casing against the hook member as will be readily understood. Moreover by making both the hook member and the hole 14 in the casing threaded, these threaded portions when drawn together by the screw form an effective lock for locking the screw, the same as two nuts when tightened on the same thread effectively lock each other. In the structure of Figs. 6 and 7 it is necessary to unscrew the screw 3 only until the hole 14 is free in order to open the fasteners, the slot 13 permitting opening and closing of the fastener without complete removal of the screw 3. As a result only a few turns of the screw are necessary to loosen the fastener or to tighten it when desired, while the sides of the outer casing will still be effectively clamped against the inner hook member. In order that this clamping action may be insured it is advantageous that the outer casing be made of resilient material such as sheet metal, the thickness of which can of course be varied as desired. It will also be understood that the fastener can be made of larger or smaller sizes as may be found necessary or convenient, and that the outer casing may also be made of rigid as well as of resilient material. Instead of using a screw for clamping the parts together a bolt 15 as shown in Fig. 5 can be used, or other suitable clamping pin or fastener. In order however that the fastener, when used on automobile chains, may not have any uneven projections for wearing the tire, it is advantageous that a screw such as shown in Figs. 1 to 4 and 7 be used, and that the chain be riveted or weld-united to avoid the use of bolt heads and similar projections. It is thereby possible to use the fastener as shown in Fig. 1 and present a smooth or relatively smooth inner surface to the vehicle tire. The fastener of the present invention can be made of wrought iron or mild steel or other suitable material and can be galvanized or otherwise suitably coated or treated to prevent rusting. It can moreover be made of non-rusting material and is advantageously so made.

The operation of the fastener of the present invention will be readily understood from the foregoing description. Chains of any suitable construction which it is desired to unite by the fastener are attached at one end by means of a rivet or bolt or by a welded link or other suitable means. By opening the fastener as shown in Figs. 3 and 7 the other end of the same chain or a link of another chain can be inserted in the hook after which by closing the parts and tightening the screw or other fastening means the fastener will be locked in closed position. Even if the fastening screw or bolt be lost, a temporary fastener such as a cotter pin or piece of wire may be used to lock the parts together and prevent opening of the fastener. The outer casing is usually made a loose fit so that it may be readily opened and closed but still clamped and held against the hook member when the screw or other tightening means is tightened. It will be seen that the outer casing conforms generally in shape to the shape of the hook member, both of these members being of substantially uniform width throughout their length except where rounded at their ends and cut away to form the opening for the chain link.

It will be understood that the form and proportions as well as the size and material of the specific embodiment of the invention illustrated and described can be varied, and that variations and modifications can be made therein without departing from the spirit and scope of the invention as set forth in the accompanying claims.

I claim:

1. A device of the nature described comprising an inner hook member having a hook recess near one end, an outer casing of resilient material inclosing said hook member and closing the side of said recess, said hook member and casing being pivotally mounted near one end with respect to each other and being provided with intermediate openings adapted to aline with each other, and fastening means adapted to pass through said intermediate alined openings for fastening said casing and hook together and for clamping the resilient member to the hook.

2. A device of the nature described comprising an inner hook member having a hook recess near one end, an outer casing of resilient material inclosing said hook member and closing the side of said recess, said hook member and casing being pivotally mounted near one end with respect to each other, and fastening means for fastening said casing and hook member together comprising a screw adapted to pass through threaded openings in said member and casing and adapted to clamp the same together.

3. A device of the nature described comprising an inner hook member having a hook recess near one end, an outer casing inclosing said hook member and closing the side of said recess, said hook member and casing being pivotally mounted near one end with respect to each other, said hook member being provided with a central threaded opening and said casing being provided on one side with a corresponding threaded opening and in the other with a central slot opening on one side, and a screw operable in said threaded openings of the hook member and casing and in said slot, said screw being adapted to clamp the casing and hook member together when tightened.

4. A device of the character described comprising a hook member having a hole in its central portion and another hole in one end and having at its other end a hook recess extending from the center thereof to one side, an outer casing inclosing said hook member made up of sheet metal and conforming generally in shape to the shape of the hook member and closing the side of said recess, said casing being provided near one end with holes alining with the hole in said hook member, and with intermediate openings in alinement with the intermediate opening in said hook member, and means adapted to extend through said intermediate openings for clamping the casing and hook member together.

5. A device of the character described comprising a hook member having a threaded hole in its central portion and another hole in one end and having at its other end a hook recess extending from the center thereof to one side, an outer casing inclosing said hook member made up of sheet metal and conforming generally in shape to the shape of the hook member and closing the side of said recess, said casing being provided near one end with holes alining with the hole in said hook member, and with intermediate openings in its sides in alinement with the intermediate opening in said hook member, the opening in one side being a threaded hole, and a screw adapted to extend through said threaded holes in the hook member and casing and clamp the other side of the casing between the screw head and hook member, whereby the casing may be clamped in position relative to the hook member and spreading of the casing may be prevented.

In testimony whereof I affix my signature in the presence of two witnesses.

JACK FAUS, JR.

Witnesses:
LEWIS C. ALLISON,
J. E. DE KALB.